Patented June 14, 1932

1,862,974

UNITED STATES PATENT OFFICE

TAINE G. McDOUGAL, OF FLINT, MICHIGAN, ASSIGNOR TO A C SPARK PLUG COMPANY, OF FLINT, MICHIGAN, A COMPANY OF MICHIGAN

CERAMIC WARES AND METHOD OF MANUFACTURE

No Drawing. Continuation of application Serial No. 291,127, filed July 7, 1928. This application filed June 20, 1929. Serial No. 372,543.

In the manufacture of porcelains and kindred ceramic products a content of approximately 50% of plastic clays is required in the raw batch to impart to the latter those properties requisite for plastic moulding or shaping or dry-pressing into the final or semifinal form of the article it is desired to produce. Clays suitable for this purpose are represented by the chemical formula $$Al_2O_3 - 2SiO_2 - 2H_2O$$

although they invariably contain as they occur in nature and even after being partly purified by sedimentation, etc., certain impurities such as iron, sodium, potassium, calcium, magnesium, titanium, and the like in variable chemical combinations. In passing through the heating or firing process, by virtue of which the shaped raw ceramic mass is made hard (semi-vitreous or vitreous), the water content ($2H_2O$) of the clay formula is driven off, leaving the original clay content represented by the chemical formula $$Al_2O_3 - 2SiO_2.$$

For the purpose of controlling the workability of the raw batch (through the formation, drying and preheating processes) the remaining approximately 50% of the raw batch is composed of various non-plastic ingredients so chosen in chemical composition as to control and effect the desired physical properties of the final fired product.

The approximately 50% of nonplastic contents as now used in the art may be divided, according to their general behavior during the firing process, into two classes of ingredients: (1) fluxes which of themselves or in combination with other ingredients present, first soften or melt during the firing process to bind or cement together the whole ceramic mass, and (2) refractories which remain more or less inert or are only slightly affected by solution by the less refractory components (such as the above mentioned fluxes) or which merely undergo a change from one crystalline structure to another.

In addition to the so-called oxides (because they are so determined and reported in chemical analyses) which are introduced as impurities principally from the clay content and which are considered to act as fluxes, it is necessary to purposely add fluxes, such as are well known in the art, to the batch to obtain the desired fired structure. These, however, as represented by their oxide formulæ, compose a small (have 10% now in good body) percentage of the raw ceramic batch, usually about 5%, although in some cases 10% or even slightly more may be used.

My invention relates more especially to that portion of the non-plastic content, which I have referred to above as the refractory ingredient, as affecting the structure and physical properties of the fired finished product. In the present art such materials as ground quartz or flint (which is most commonly used), various naturally occurring or artificially prepared combinations of $Al_2O_3$ and $SiO_2$ such as would correspond to the composition of andalusite sillimanite, mullite, cyanite or intermediate compositions, or corundum ($Al_2O_3$) are used.

It has long been recognized in the art that non-plastic contents higher in $Al_2O_3$ than represented by the formula $Al_2O_3.2SiO_2$ (calcined clay) produced fired structures having improved physical properties including especially higher resistance to heat shock and generally higher mechanical strength. Bruno Kerl on page 1392 (third German edition 1907) of his Handbuch der Gesammten Thonwaarenindustrie reports that Hecht used an artificially prepared non-plastic refractory component (for introduction into the raw ceramic mass) as follows: A composition of 6 parts by weight of Rakonitzer shale and one part of chemically clean alumina ($Al_2O_3$) was fired to Seger cone 20 (2768° F.). The resultant calcined product was finely pulverized and used in the raw ceramic batch as the non-plastic content. Kerl also records (pages 1392 and 1393) production by the Royal Porcelain Factory of Berlin of a porcelain designed for many purposes where high temperatures are encountered. This porcelain body was rich in alumina and poor in silica and contained a certain amount of fluxes, magnesia included. From more recent work done by Bowen and Greig of the U. S. Geophysical Laboratories and published in 1924 it is thought that it is to the presence of the crystal mullite ($3Al_2O_3.2SiO_2$) introduced by the calcines mentioned above that the fired structure probably owed its improved qualities.

More recently various means of arriving at a non-plastic ingredient (and consequently a finished product) higher in $Al_2O_3$ than normal (one molecule of alumina to two of silica) have been used such as direct use of naturally occurring andalusite or cyanite. In each case, however, either the crystalline form as occurs in nature or as purposely developed by calcining a suitably composed mixture of alumina and silica has been employed. Usually a suitable flux is incorporated in the calcine as this affords an opportunity to distribute the flux evenly throughout the raw batch.

Bell records in Transactions of the American Ceramic Society, vol. 9, pages 637-645, published in 1907, successful betterments in heat shock values of porcelains by introducing in the refractory part of his non-plastic content, alumina in the form of aluminum hydroxide, although he reported attempts to increase the alumina content through additions of alundum as unsuccessful undoubtedly because of the high refractoriness and inertness of the alundum crystal fragments. However, use of aluminum hydroxide in a raw ceramic mass adversely affects its plasticity and workability as is well known in the art.

Now, any of the crystalline forms of alumina and silica in combination, or that of alumina itself (corundum), are extremely refractory and are only slowly and partially dissolved by the fluxes in the firing process. Inasmuch as such ingredients are introduced in the raw ceramic batch as finely ground fragments of their original crystalline forms, they do not have an opportunity to grow because they or their derivatives are in a stable refractory and undissolved state. For instance, a raw ceramic batch into which fragments of refractory andalusite crystals has been introduced would not develop in the firing process the formation of any appreciable amount of the desirable needle-like mullite (formerly erroneously identified at sillimanite) crystals although the ingredients ($Al_2O_3$ and $SiO_2$) necessary for the formation of the mullite are present for the reason that the ingredients are in a form which does not permit growth into the desirable needle-like crystals.

The fired bodies, such as the above cited examples, depend for their strength primarily upon the fired strength of the plastic portion. The non-plastic portion affects this strength generally in proportion to the amount added. It is desirable that the final firing produce a cohesion of the non-plastic material within the body for this would result in the development of a crystalline framework within the body that would give added mechanical and dielectric strength and resistance to heat shock. Heretofore this has not been possible for the final firing temperature is not sufficiently high to cause fusion of the fragments of the refractory crystals, and so they remain practically unchanged, appearing as an aggregate in the final product. If the final firing temperature were sufficiently high to fuse the non-plastic ingredient, the body would melt away and lose its shape. This would prevent the use of the process for anything except hot-molded articles, and would render it useless in the manufacture of commercial ceramic ware, and other articles that are formed prior to firing.

I have discovered a method by which crystalline aluminum silicates of various kinds, and of which mullite is a prominent example, may be incorporated in a porcelain body so as to produce the desired crystalline framework upon final firing at the usual temperatures. This method consists in adding to the plastic ingredient of the batch non-plastic aluminum silicates in an unstable crystalline form. Upon final firing of the batch thus constituted, the non-plastic material undergoes marked crystalline growth within the body forming the desired crystalline framework.

The manner of preparing the non-plastic material in unstable crystalline form is described and claimed in my copending application, S. N. 371,068 filed June 14, 1929. Briefly, this method consists in heating the aluminum silicates to complete fusion, preferably with the aid of an electric arc, and preferably with the addition of fluxes either included in the raw material, or separately added, and cooling the fused material as rapidly as possible. This may be accomplished by pouring the fused material, drop by drop, or in a fine stream, into a trough down which a stream of water is flowing. A settling tank is provided to receive the stream and the material is collected in the bottom of the tank. The unstable crystalline material consists of crypto-crystals, that is, crystals that require the highest magnification to render them visible; of very minute crystals, the largest of which are of a magnitude of the order of .10 millimeters; and also of unstable glass closely associated with them. It will be understood that where the phrase "unstable crystalline material" as used hereinafter in the claims includes within its scope any and all of the physical forms just enumerated. In practically all melts the majority of the crystals are very much under .10 millimeters, and in melts of some compositions practically no crystals are produced of larger magnitude than .001 millimeters.

The unstable crystalline material is unstable in the sense that upon subsequent heat treatment, as in the firing of the ceramic mass to form the final product, regular full crystalline shapes will orient themselves from the material during the firing process, producing the desirable crystalline framework.

According to my present invention, I propose to employ the new unstable crystalline material thus obtained as the non-plastic ingredient of a ceramic batch. A typical batch, such as may be employed in the manufacture of porcelain spark plug insulators, will consist of approximately 50% plastic clays, approximately 5% of a suitable flux or fluxes, such as magnesium oxide, and the remainder of the described non-plastic material, such as mullite composition in unstable crystalline form. The above composition may be variously modified in character and percentages of ingredients. If desired, the flux may be entirely or partly embodied in the non-plastic melt. In place of magnesium oxide I may employ any of the alkali or alkaline earth fluxes.

From the batch articles, such as spark plug porcelains, are molded in the usual way, and fired to the usual temperatures. Examination of the fired products shows that marked crystalline growth has taken place within the body during firing, and that it possesses to a high degree, the desired crystalline framework. In the case of sillimanite and mullite the normal crystals develop actual tuft-like growths that penetrate into the adjacent portions of the porcelain body and knit it together. I believe this growth of the crystalline particles takes place principally by accretion from the unstable glass surrounding them and also by growth from new nuclei.

By means of my invention the necessary chemical ingredients to form full and normally grown crystals, such as the desirable needle-like mullite form, are introduced in an unstable form (with fluxes intimately included or in solution in the glass) from which the fully grown crystals may most easily form with application of the heat in the subsequent firing process.

The addition of the described unstable crystalline material to the batch produces a marked increase in the mechanical strength, electrical resistance and thermo-dielectric strength, and in resistance to heat and heat shock of the fired product. As a consequence, the described ceramic composition is of great value in the manufacture of such articles as spark plugs, electric insulators, furnace linings and the like where the enumerated qualities are of the greatest importance.

This case is a continuation of my prior application Serial Number 291,127, filed July 7, 1928.

I claim:

1. A raw ceramic batch comprising a mixture of plastic material and non-plastic material, the non-plastic material being in the form of unstable crystals of the order of less than .10 millimeters in magnitude.

2. A raw ceramic batch comprising a mixture of plastic material, non-plastic material, and a flux, the non-plastic material being in the form of unstable crystals of the order of less than .10 millimeters in magnitude.

3. A raw ceramic batch comprising a mixture of clay, and non-plastic material including aluminum silicates in unstable crystalline form.

4. A raw ceramic batch comprising a mixture of clay, a flux, and an aluminum silicate having a higher molecular ratio of alumina to silica than clay, in unstable crystalline form.

5. A raw ceramic batch comprising a mixture of clay and mullite in unstable crystalline form.

6. A raw ceramic batch consisting of a mixture of approximately 50% clay, approximately 45% mullite in unstable crystalline form, and approximately 5% flux.

7. The process of making ceramic wares which consists in preparing non-plastic material in unstable crystalline form, mixing the non-plastic material with the plastic material to form the raw batch, molding the wares from the batch, and firing the wares thereby producing a crystalline framework within the body as a result of further growth of the unstable crystalline material during final firing.

8. The method of making ceramic wares which consists in fusing non-plastic material and quickly chilling it to convert it into unstable crystalline form, mixing the material with plastic material to form the raw batch, molding the wares from the batch, and firing the wares thereby producing a crystalline framework within the body as a result of further growth of the unstable crystalline material during final firing.

9. The process of making ceramic wares which consists in fusing non-plastic material and a suitable flux, and quickly chilling it to convert it into unstable crystalline form, mixing the material with plastic material to form the raw batch, molding the wares from the batch, and firing the wares thereby producing a crystalline framework within the body as a result of further growth of the unstable crystalline material during final firing.

10. The process of making refractory wares of high dielectric strength and resistance to heat, heat shock, and mechanical stresses which consists in preparing an aluminum silicate in unstable crystalline form, mixing the aluminum silicate with clay to form a raw batch, forming the articles from the batch and firing the articles thereby producing a crystalline framework within the body as a result of further growth of the crystals during final firing.

11. The process of making refractory wares which consists in preparing a normally crystalline aluminum silicate having a higher molecular ratio of alumina to silica than clay in arrested crystalline form, mixing the aluminum silicate with clay, with or without a flux, forming the articles from the batch, and firing the articles thereby producing a crystalline framework within the body as a result of further growth of the crystals during final firing.

In testimony whereof I affix my signature.

TAINE G. McDOUGAL.